2 Sheets—Sheet 1.
C. C. HAYNES.
Milk-Cooler.
No. 228,756. Patented June 15, 1880.
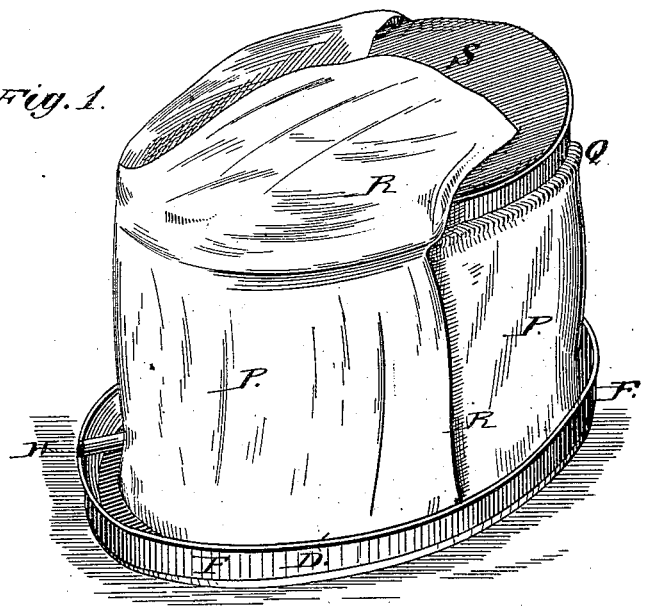
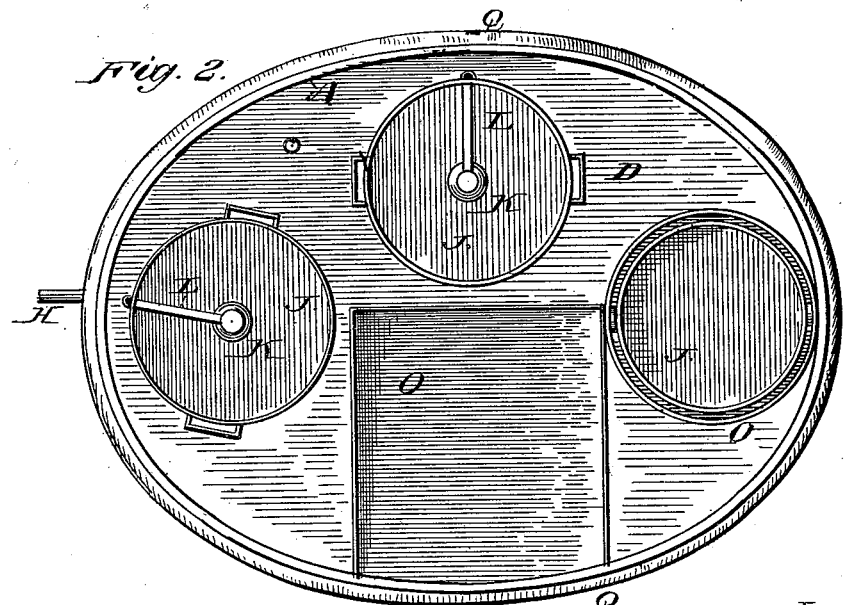

2 Sheets—Sheet 2.
C. C. HAYNES.
Milk-Cooler.
No. 228,756. Patented June 15, 1880.
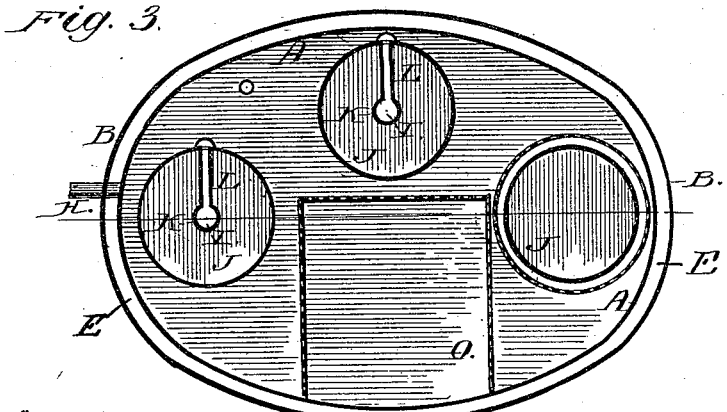
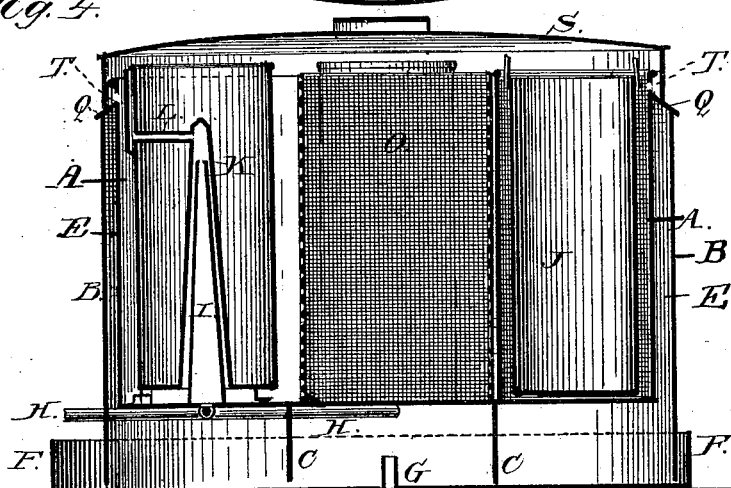
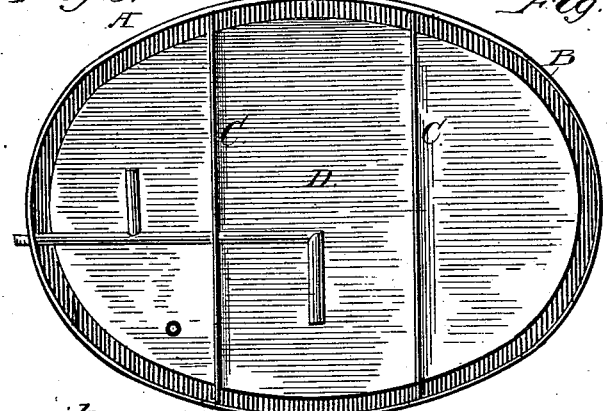
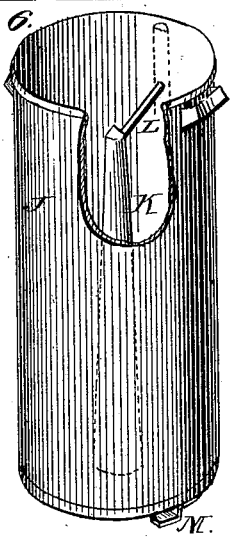
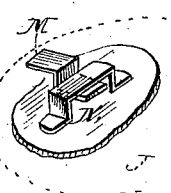

UNITED STATES PATENT OFFICE.

CLINTON C. HAYNES, OF WILMINGTON, VERMONT.

MILK-COOLER.

SPECIFICATION forming part of Letters Patent No. 228,756, dated June 15, 1880.

Application filed June 16, 1879.

*To all whom it may concern:*

Be it known that I, CLINTON C. HAYNES, of Wilmington, in the county of Windham and State of Vermont, have invented certain new and useful Improvements in Milk-Coolers; and I do hereby declare that the following is a full, clear, and exact description of the invention, which will enable others skilled in the art to which it appertains to make and use the same, reference being had to the accompanying drawings, which form a part of this specification.

Figure 1 is a perspective view. Fig. 2 is a top view, the cover having been removed. Fig. 3 is a horizontal cross-section. Fig. 4 is a vertical cross-section. Fig. 5 is a bottom plan. Fig. 6 is a perspective view of one of the milk-vessels, part of which has been broken off in order to better show the construction; and Fig. 7 is a view showing the method of securing the milk-vessels in the cooler.

Corresponding parts in the several figures are denoted by like letters of reference.

This invention relates to that class of milk-coolers which consist of a water-vessel through which cold water may circulate around one or more milk cans or coolers placed in said water-vessel; and it consists of certain details of construction, hereinafter more fully set forth.

The water-vessel A, which may be round, elliptical, or of any other convenient shape, is inclosed by an outer wall or case, B, extending from near the top of water-vessel A to some distance below its bottom, below which bottom the sides of the wall or case B are connected by braces C C, which also serve to support the bottom D of water-vessel A. A dead-air space, E, is thus formed around the water-vessel A, the temperature in which is thereby protected from influence by the outer air.

The water-vessel A and case B are placed in a receiving-pan, F, centrally in which is located an escape-tube, G, of less height than the sides or walls of said pan. The pan F receives the water escaping from the water-vessel, as will be hereinafter described, and retains it until it can escape through tube G.

It will thus be seen that the water in pan F forms a seal for the dead-air space E.

Water is admitted into water-vessel A through a tube, H, located below its bottom, and branching upward into several vertical tubes, I I, located in the water-vessel and reaching to within a short distance of its top.

J J are the milk cans or coolers, which are preferably cylindrical in shape, and provided each with a centrally-located vertical tube, K, closed at the top, and of sufficient size to fit loosely over one of the tubes I I in the water-vessel A. A vent-tube, L, extends from the top of tube K through the side of each milk can or cooler, and from thence upward nearly to the top, the object of said tube being simply to facilitate the placing or removal of the milk cans or coolers.

Each milk can or cooler is provided upon its under side with a series of hooks, M, arranged at an equal distance from the center, and all pointing in the same direction. In the bottom of the water-vessel, at a suitable distance from each of the tubes I, is arranged a loop or bail, N, adapted to engage one of the hooks M when the milk can or cooler is slightly turned after adjusting it, and thus retain it securely in position without necessity for weights, cross-slats, or other means. The central tube serves as a guide, which makes the adjustment very easy and convenient.

If desirable, one or more ice-compartments, O, formed of perforated sheet metal, may be arranged in the box. When not in use for ice milk-cans may be placed therein.

The box or water-vessel A is provided with an apron or envelope, P, of any suitable textile material, such as canvas, blanketing, or the like. Said envelope may be secured in any convenient manner, its upper edge being supported upon the flange Q, forming the top of the dead-air space. Two or more flaps, R, secured to the top edge of envelope P, are adapted to be thrown up over the cover S when in position. The top edge of the water-vessel A is provided with a series of small perforations, T T, all on the same level above the flange Q.

In operation, after placing the milk cans or coolers in position and adjusting the cover and the textile envelope, water is conducted into the water-vessel through the tube H, from which it passes up into tubes I I, out at the top of these, down between the tubes I and K, and finally out into the water-vessel, where it surrounds the milk cans or coolers. As the water rises to the top of the water-vessel it escapes through the perforations T T, from whence it passes through the textile envelope or covering to the receiving-pan, where it forms a seal for the dead-air space E, until it finally escapes through tube G to some suitable waste-water receptacle arranged below. While passing through the textile covering the water has an opportunity to evaporate freely, thereby greatly reducing the temperature in the water-vessel. With the same object in view, I propose to keep the top-covering R continually soaked, which may easily be done.

Having thus described my invention, I claim and desire to secure by Letters Patent of the United States—

1. In a milk-cooler, the combination, with an inner vessel provided near its upper end with openings for the escape of water, of an outer wall surrounding said inner vessel, terminating below the water-escape openings and forming a dead-air space, and a textile covering or envelope for said outer wall, as set forth.

2. The combination, with the outer wall or casing having textile covering or envelope, of the inner water-vessel provided with a projecting flange which secures and retains the textile cover around the outer casing, said casing and vessel being so related as to leave a dead-air space between them, as set forth.

3. The combination, with an outer casing, of an inner water-vessel supported on flanges above the lower edge of the casing, and provided with a projecting flange to fit the top of the casing, said parts being so related as to secure a continuous dead-air space between them and below the bottom of the vessel, as set forth.

4. The combination, with an outer casing, of an inner water-vessel supported on flanges above the lower end of the casing, and provided with a projecting flange to fit the top of the casing, said parts being so related as to secure a continuous dead-air space between them and below the bottom of the vessel, and a waste-pan provided with an upward-projecting waste or water-escape tube, as set forth.

5. The combination, with a water-vessel constructed substantially as described, and having vertical water-induction tubes open at the top, of a milk can or cooler having a centrally-located vertical tube fitting loosely over one of the water-induction tubes in the vessel, and having its upper closed end connected with the outside and top of the milk-can by a vent-tube, as set forth.

6. The combination, with a milk can or cooler having a central vertical tube, and provided under its bottom with a series of hooks, all pointing in one direction and at an equal distance from the central point, of a water-vessel having vertical water-induction tubes which fit loosely in the tubes of the milk-vessels, and provided in its bottom with loops or bails which engage the hooks at the bottom of the milk-vessels, as set forth.

In testimony that I claim the foregoing as my own I have hereto affixed my signature in presence of two witnesses.

CLINTON C. HAYNES.

Witnesses:
GEO. E. HAYNES,
HENREY P. BOUKER.